United States Patent
Parhi et al.

(10) Patent No.: US 12,386,610 B2
(45) Date of Patent: Aug. 12, 2025

(54) CODE MODIFICATION MANAGEMENT USING MACHINE LEARNING

(71) Applicant: Dell Products L.P., Round Rock, TX (US)

(72) Inventors: Shishir Kumar Parhi, Bhadrak (IN); Sashibhusan Panda, Bengaluru (IN); Sambasivarao Gaddam, South Grafton, MA (US); Venkata Nagendra Purushotham Musti, Hyderabad (IN); Hung Dinh, Austin, TX (US); Bijan Kumar Mohanty, Austin, TX (US); Sourav Datta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 184 days.

(21) Appl. No.: 18/139,746

(22) Filed: Apr. 26, 2023

(65) Prior Publication Data

US 2024/0362017 A1    Oct. 31, 2024

(51) Int. Cl.
*G06F 9/44* (2018.01)
*G06F 8/71* (2018.01)
*G06F 8/73* (2018.01)

(52) U.S. Cl.
CPC . *G06F 8/71* (2013.01); *G06F 8/73* (2013.01)

(58) Field of Classification Search
None
See application file for complete search history.

(56) References Cited

U.S. PATENT DOCUMENTS

| 2008/0250394 A1* | 10/2008 | Jones | G06F 8/73 |
| | | | 717/123 |
| 2010/0146491 A1* | 6/2010 | Hirano | G06F 8/73 |
| | | | 717/137 |
| 2011/0153683 A1* | 6/2011 | Hoskinson | G06F 16/29 |
| | | | 707/E17.03 |
| 2012/0192151 A1* | 7/2012 | Parkes | G06F 8/10 |
| | | | 717/120 |
| 2020/0301672 A1* | 9/2020 | Li | G06F 11/3608 |
| 2024/0346248 A1* | 10/2024 | Rappo | G06F 40/216 |

OTHER PUBLICATIONS

Menaka Pushpa Arthur, "Automatic Source Code Documentation using Code Summarization Technique of NLP", 2020 (Year: 2020).*
Srinivasan Iyer et al., "Summarizing Source Code using a Neural Attention Model", Aug. 2016 (Year: 2016).*
(Continued)

*Primary Examiner* — Bradley A Teets
*Assistant Examiner* — Lanny N Ung
(74) *Attorney, Agent, or Firm* — Ryan, Mason & Lewis, LLP

(57) ABSTRACT

A method comprises collecting data corresponding to one or more code changes in response to committing of the one or more code changes to a code repository, and formatting the data into at least one data string. The at least one data string is inputted to one or machine learning models. Using the one or machine learning models, a natural language description of the one or more code changes is generated based at least in part on the at least one data string. The method further comprises causing transmission of the natural language description of the one or more code changes to a document repository.

20 Claims, 16 Drawing Sheets

(56) References Cited

OTHER PUBLICATIONS

Boao Li et al., "DeepCommenter: A Deep Code Comment Generation Tool with Hybrid Lexical and Syntactical Information", 2020 (Year: 2020).*
Ionos, "What is a URL (Uniform Resource Locator)?", Feb. 2023 (Year: 2023).*
A. Vaswani et al., "Attention Is All You Need," arXiv:1706.03762v5, Dec. 6, 2017, 15 pages.
Gitlab, "The DevSecOps Platform," https://about.gitlab.com/, Accessed Apr. 13, 2023, 5 pages.
Sopha M., "URI vs URL: Differences and When to Use Them," https://www.hostinger.com/tutorials/uri-vs-url#:~: text=URI%20identifies%20a%20resource%20and,a%20domain%20name%20and%20port., Apr. 5, 2023, 10 pages.
U.S. Appl. No. 17/866,764, filed in the name of Lisandro Ramos et al. Jul. 18, 2022, and entitled "Product Configuration Analysis and Anomaly Prediction Using Machine Learning."

* cited by examiner

400

```
!pip install keytotext
Requirement already satisfied: keytotext in c:\other\mytechnology\anaconda3\lib\site-packages (1.5.2)
Requirement already satisfied: datasets in c:\other\mytechnology\anaconda3\lib\site-packages (from keytotext) (1.18.3)
Requirement already satisfied: huggingface_hub in c:\other\mytechnology\anaconda3\lib\site-packages (from keytotext) (0.
4.0)
Requirement already satisfied: wandb in c:\other\mytechnology\anaconda3\lib\site-packages (from keytotext) (0.12.10)
```

FIG. 4

```
from keytotext import pipeline
nlgModel = pipeline("k2t-base")  #loading the pre-trained model
params = {"do_sample":True, "num_beams":4, "no_repeat_ngram_size":3, "early_stopping":True}  #decoding params genSentence = nlgModel(['ProSupportPlus', 'Next Day Support', '12 months'], **params)  #keywords
print(genSentence)
```

```
from transformers import pipeline, set_seed
generator = pipeline('text-generation', model='gpt2')
set_seed(42)
sentence = generator("public List<Orders> orderRepository.findById(id), removed, public List<Orders> getOrderById(Integer id,
    max_length=30, num_return_sequences=5)
setting 'pad_token_id' to 'eos_token_id':50256 for open-end generation.

print(sentence[1])
```

```java
import java.util.Optional;import java.util.List;
import com.dell.foo.dao.Orders;@Autowired OrderRepository orderRepository;
public Optional<Orders> getOrderById(Integer id) {
    return orderRepository.findById(id);
}
public List<Orders> getOrderById(Integer id, String orderType, String region) {
    return orderRepository.findByIdAndOrderTypeIgnoreCaseAndRegionContainingIgnoreCase(id, orderType, region);
}
```

CODE MODIFICATION MANAGEMENT USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to management of code modifications in information processing systems.

BACKGROUND

Design documentation incudes a collection of documents and resources that cover multiple aspects of a product design. Documentation includes, for example, information about users, product features, project deadlines and implementation details. Design documentation may correspond to low-level design (LLD) and high-level design (HLD) features. Due to product design changes, design documents typically need to be updated.

With conventional approaches, design changes may be missed or misinterpreted so that design documents may not be updated or may be updated incorrectly. In addition, design documentation may be updated in the wrong location that does not pertain to the change and/or does not correspond to the latest documentation.

SUMMARY

Embodiments provide a design documentation management platform in an information processing system.

For example, in one embodiment, a method comprises collecting data corresponding to one or more code changes in response to committing of the one or more code changes to a code repository, and formatting the data into at least one data string. The at least one data string is inputted to one or machine learning models. Using the one or machine learning models, a natural language description of the one or more code changes is generated based at least in part on the at least one data string. The method further comprises causing transmission of the natural language description of the one or more code changes to a document repository.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts example pseudocode for leveraging Key2Text transformers to generate sentences from a set of input words in an illustrative embodiment.

FIG. 5 depicts example pseudocode for passing words for product attributes as a list of text to a model for sentence generation in an illustrative embodiment.

FIG. 6 depicts example pseudocode for generating a pre-trained GPT2 transformer model from a transformer pipeline and passing attribute values in concatenated text to generate sentences in an illustrative embodiment.

FIG. 7 depicts collected data corresponding to code changes in an illustrative embodiment.

FIG. 8 depicts formatted data corresponding to code changes in an illustrative embodiment.

FIG. 10A depicts collected data corresponding to code changes with highlighted key words in an illustrative embodiment.

FIG. 10B depicts collected data corresponding to code changes with highlighted key words in an illustrative embodiment.

FIG. 11 depicts collected data corresponding to code changes with highlighted key words in an illustrative embodiment.

DETAILED DESCRIPTION

Figure 1:
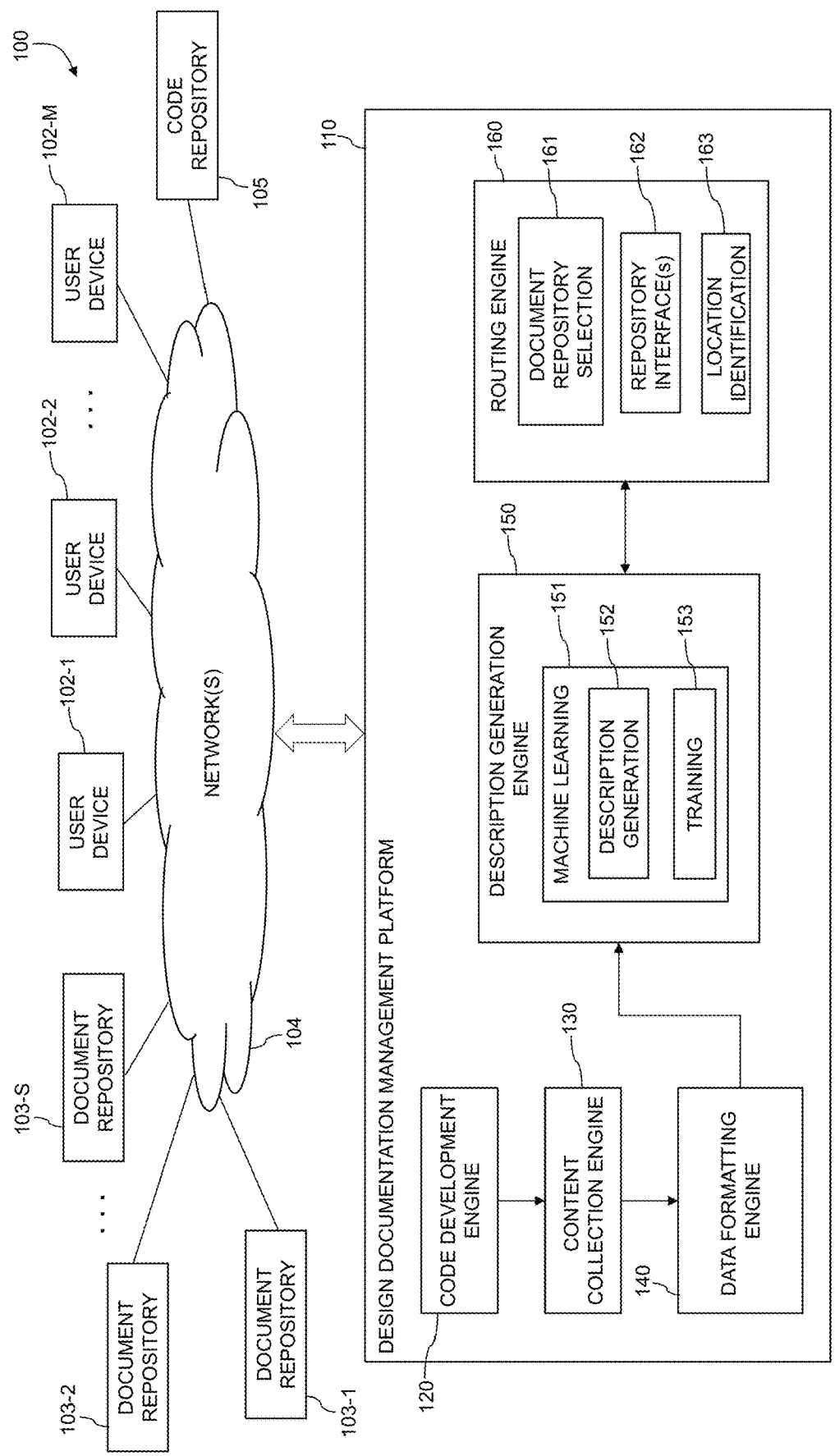
FIG. 1 depicts an information processing system with a design documentation management platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in artificial intelligence where natural language input is disassembled and parsed to determine appropriate syntactic and semantic schemes in order to comprehend and use languages. NLU may rely on computational models that draw from linguistics to understand how language works, and comprehend what is being said by a user.

As used herein, "natural language generation (NLG)" is to be broadly construed to refer to a computer process that transforms data into natural language. For example, NLG systems decide how to put concepts into words. NLG can be accomplished by training machine learning models using a corpus of human-written texts.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises user devices 102-1, 102-2, . . . 102-M (collectively "user devices 102"), document repositories 103-1, 103-2, . . . 103-S (collectively "document repositories 103") and at least one code repository 105. The user devices 102, document repositories 103 and code repository 105 communicate over a network 104 with a design documentation management platform 110. The variable M and other similar index variables herein such as K, L and S are assumed to be arbitrary positive integers greater than or equal to one.

The user devices 102 can comprise, for example, Internet of Things (IoT) devices, desktop, laptop or tablet computers, mobile telephones, or other types of processing devices capable of communicating with the design documentation management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise.

The terms "customer," "administrator" or "user" herein are intended to be broadly construed so as to encompass numerous arrangements of human, hardware, software or firmware entities, as well as combinations of such entities. Design documentation management services may be provided for users utilizing one or more machine learning models, although it is to be appreciated that other types of infrastructure arrangements could be used. At least a portion of the available services and functionalities provided by the design documentation management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the design documentation management platform 110, as well as to support communication between the design documentation management platform 110 and connected devices (e.g., user devices 102) and/or other related systems and devices not explicitly shown.

In some embodiments, the user devices 102 are assumed to be associated with repair technicians, system administrators, information technology (IT) managers, software developers, release management personnel or other authorized personnel configured to access and utilize the design documentation management platform 110.

The user devices 102 are respectively associated with one or more programmers, subject matter experts (SME) or other technical personnel of, for example, an enterprise, who are involved in the design, development, updating and/or versioning of applications, programs, firmware, software or other forms of programming. As explained in more detail herein, the programmers commit code changes to one or more code repositories 105 using, for example, a software development platform like Gitlab. Once code development is completed, a programmer will commit the changes to a code repository 105 (e.g., Gitlab commit SHA: 45c9428c360aeafa17a0e0e9cf7b12d9cca59990).

As noted herein above, with conventional approaches, software design changes may be missed or misinterpreted, resulting in design documents that are not updated or updated incorrectly. In addition, design documentation may be updated in document repository locations that do not pertain to the code changes and/or do not correspond to the latest documentation.

To address the above-noted technical problems with updating design documentation, the illustrative embodiments provide techniques to automatically update design documents in response to code changes. Advantageously, the embodiments provide a platform that triggers collection of and collects code changes in response to code commits on a software development platform (e.g., Gitlab). The code changes are analyzed using one or more machine learning models to generate a natural language description of the changes, and the description is routed to appropriate design documentation locations (e.g., document repositories 103), where the design documentation is updated to include the code change descriptions. The embodiments advantageously provide techniques to identify and format code changes into one or more data strings, which are inputted to one or machine models that are configured to leverage NLP, NLU, NLG and other machine learning algorithms to generate the code change descriptions.

The design documentation management platform 110 in the present embodiment is assumed to be accessible to the user devices 102, document repositories 103, code repository 105 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the design documentation management platform 110 includes a code development engine 120, a content collection engine 130, a data formatting engine 140, a description generation engine 150 and a routing engine 160. The description generation engine 150 includes a machine learning layer 151 comprising description generation and training layers 152 and 153. The routing engine 160 includes a document repository selection layer 161, one or more repository interfaces 162 and a location identification layer 163.

Figure 2:
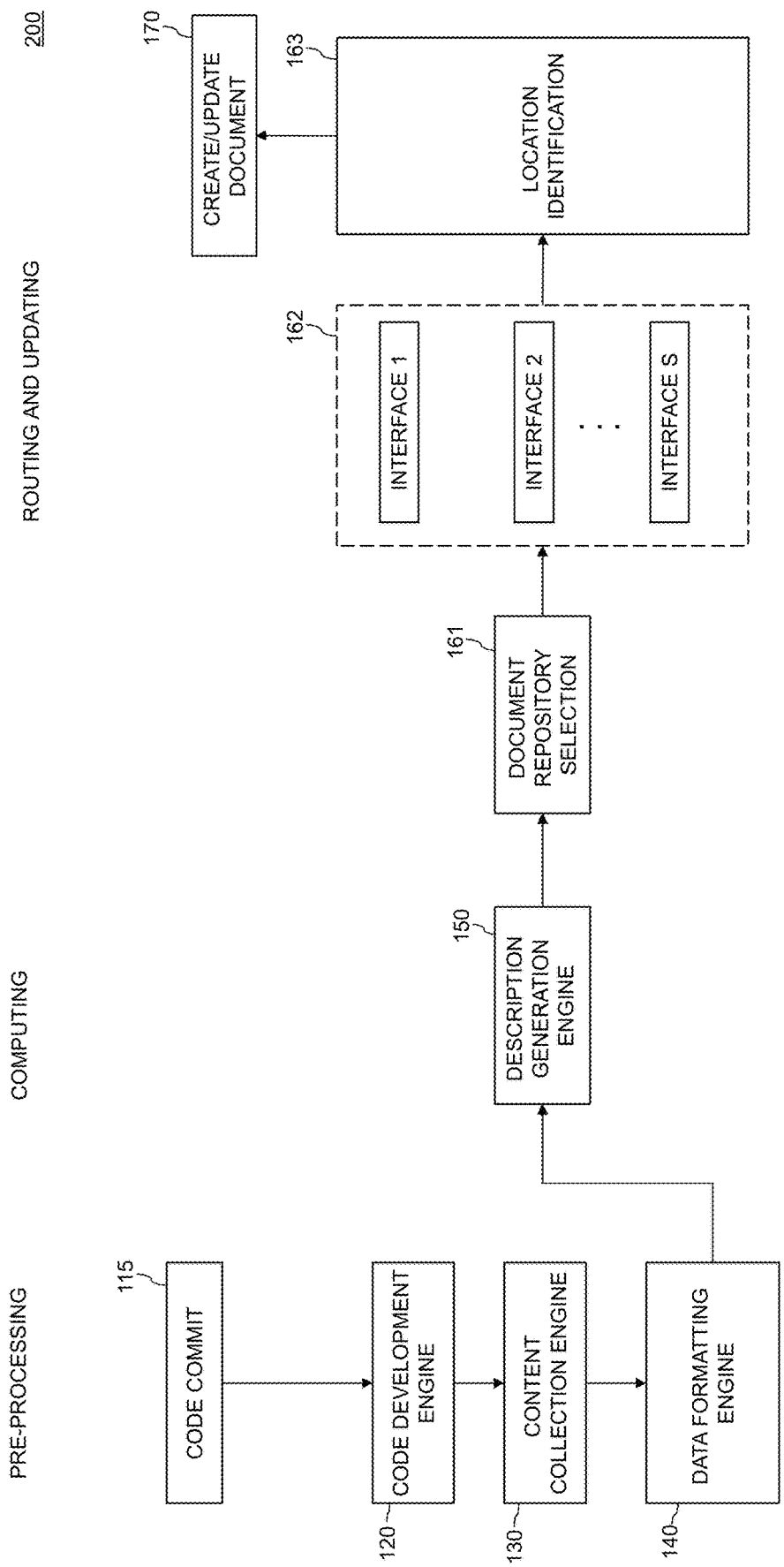
FIG. 2 depicts an operational flow for design documentation management in response to code changes in an illustrative embodiment.

Referring to FIG. 1 and to the operational flow 200 in FIG. 2, in a pre-processing stage, once code development is completed, and a programmer commits the changes to a code repository 105 (e.g., code commit 115), the code development engine 120 (e.g., continuous integration/continuous deployment (CI/CD) pipeline) will automatically trigger the content collection engine 130 to pull the code changes as plain text and feed the changes into the data formatting engine 140. The data formatting engine 140 is configured to remove redundant information and maintain actual code differences and required metadata (e.g., application name, target design document database uniform resource identifier (URI), etc.). The data formatting engine 140 is further configured to construct a data string that can be input to a machine learning model for code change description generation.

Figure 7:
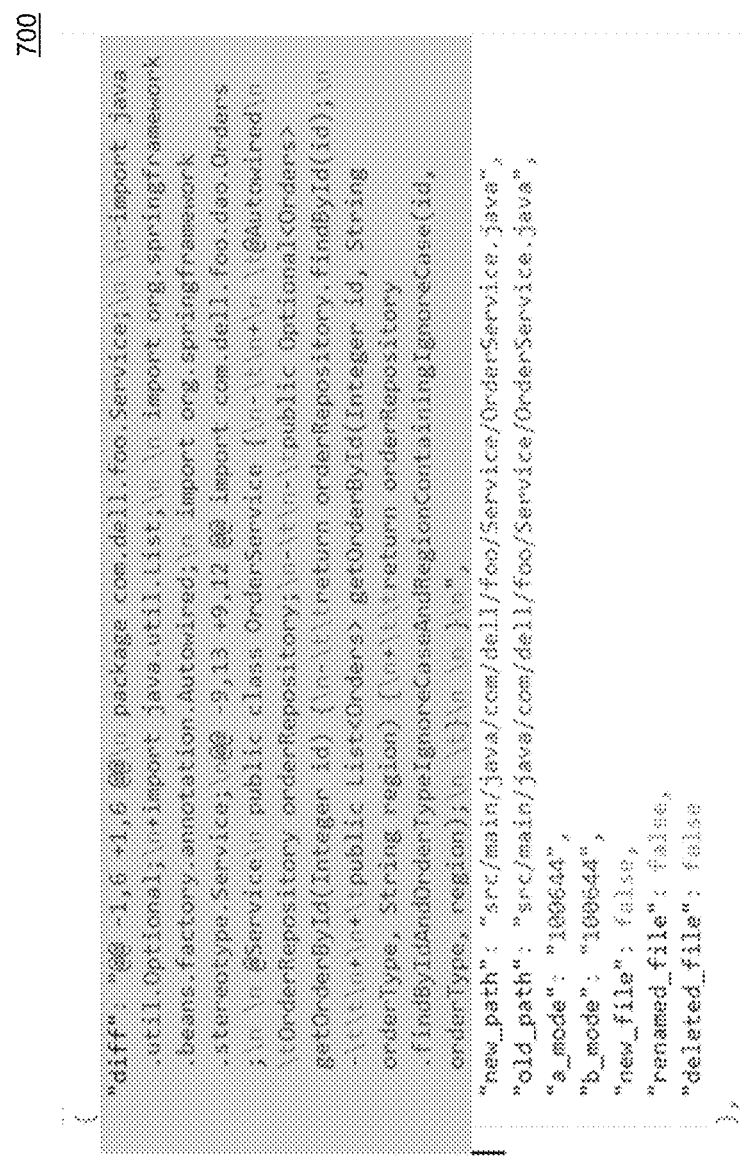

For example, collected data 700 corresponding to code changes as collected by the content collection engine 130 is depicted in FIG. 7 and formatted data 800 corresponding to the code changes as formatted by the data formatting engine is depicted in in FIG. 8. FIGS. 7 and 8 refer to an operational example where, for a commercial transaction, a rest service is created to provide order details for a given order number. In this example, an application programming interface (API) needs to be enhanced to filter only the orderType="SalesOrder" for a specific region. In this case, a Gitlab API is used to pull raw data (e.g., collected data 700) from the code repository 105 following the committing of the code changes. The Gitlab API corresponds to the following uniform resource locator (URL):

url: https://gitlab.dell.com/api/v4/projects/165681/repository/commits/feature/diff The collected data 700 comprises the code changes and metadata associated with the code changes. The metadata comprises, for example, identifying information of an application for which the code changes have been made (e.g., application name or other identifier), identifying information of the document repository (e.g., URIs, URLs, macros, annotations, etc.) including the design documentation corresponding to the code changes, and/or identifying information of one or more documents in the document repository corresponding to the code changes.

By removing redundancies from the collected data 700 and determining and maintaining portions of the collected data 700 specifying the code changes, the data formatting engine 140 constructs a data string as shown, for example, in the formatted data 800. In the formatted data 800, − denotes removal of code and + denotes the addition of new code. In the non-limiting operational example, 'return orderRepository.findById(id)' is removed and 'public List<Orders> getOrderById(Integer id, String orderType, String region)' is added, resulting in filtering only the orderType="SalesOrder" for a specific region.

Based on the data string input from the data formatting engine 140, in a computing stage, the description generation engine 150 uses NLP, NLU and NLG machine learning techniques to generate a natural language description of the functionality change caused by the code change. In other words, the description generation engine 150, more particularly, the description generation layer 152 of the machine learning layer 151, generates a description of the design changes made in the code as received from the code repository 105. The description is generated by using highly sophisticated neural networks and NLG techniques. Some approaches for sentence generation that may be used by the machine learning model include, but are not necessarily limited to, recurrent neural networks (RNNs), long short-term memory (LSTM) techniques, etc. In illustrative embodiments, the machine learning model leverages transformers for NLP, NLU and NLG techniques. Some of the types of transformers that can be used by the embodiments, include, but are not necessarily limited to, a Bidirectional Encoder Representations from Transformers (BERT) model, a GPT model and a GPT2/3 model. According to one or more embodiments, the technique starts with a pre-trained transformer which is further trained through the training layer 153 with a customized design data corpus of, for example, an enterprise, to yield accurate sentence generation. Referring back to the operational example of creating a rest service to provide order details for a given order number, a generated description by the description generation engine 150 may recite, for example, "order management service to fetch all the order details based on an order ID for a specific order type and for the specified region."

Figure 3A:
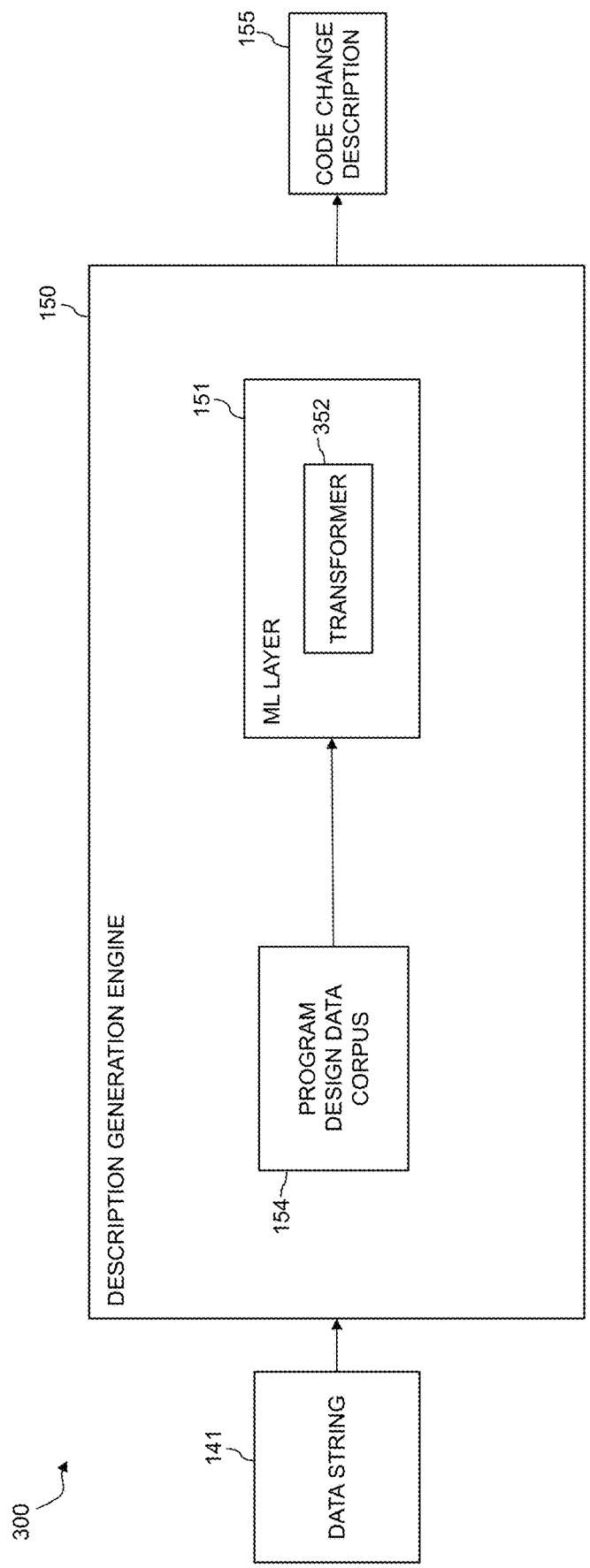
FIG. 3A depicts an operational flow for code change description generation in an illustrative embodiment.

The embodiments provide techniques for NLG of code change descriptions from data strings received from the data formatting engine 140. For example, referring to the operational flow 300 in FIG. 3A, when a data string is constructed by the data formatting engine 140, a request to the description generation engine 150 is invoked to generate a code change description 155 from the data string 141 for the created product. The description generation engine 150 includes a machine learning (ML) layer 151, which leverages NLG and is trained with historical data from a program design data corpus 154. The corpus 154 may originate from, for example, an enterprise or other organization to accurately generate textual descriptions of code changes that may be related to a given enterprise or organization.

The description generation engine 150 generates a code change description 155 from a corresponding data string 141 using highly sophisticated neural networks and NLG techniques. As part of the description generation layer 152, illustrative embodiments leverage one or more transformers (e.g., transformer 352). As used herein, a "transformer" is to be broadly construed to refer to a deep learning model that differentially weighs the significance of portions of input data. Similar to RNNs, transformers manage sequential input data. However, transformers do not necessarily process the data in order, and utilize mechanisms which provide context for any position in an input sequence. By identifying context, a transformer does not need to process the beginning of a data sequence before the end of the data sequence, which allows for more parallelization than RNNs to reduce training time. Non-limiting examples of transformer-based neural network machine learning models that may be used by the embodiments are a BERT model, a GPT model and a GPT2/3 model, which may use context from both directions, and use encoder parts of transformers to learn a representation for each token.

In some embodiments, a pre-trained transformer 352 trained with large amounts of general-purpose text is then trained with custom enterprise corpus data (e.g., historical program design data) for accurate sentence generation. The transformer 352 solves sequence to sequence issues while handling long-range issues. Since the design changes in code in natural language are essentially a sequence of words in the body of text, and the output sentence is also a sequence of words, this can be modeled as a many-to-many sequence-to-sequence problem which the transformer 352 solves.

A many-to-many sequence-to-sequence configuration has two core building blocks (encoder and decoder) and one supporting capability called an "attention mechanism." The encoder-decoder architecture solves sequence-to-sequence problems like text generation or sentence generation tasks where input and output sequences are of different lengths. Considering an input textual message is similar to a time series model where the words come one after another in time and/or space, the transformer 352 comprises a sophisticated encoder-decoder with a multi-head attention mechanism.

Figure 3B:
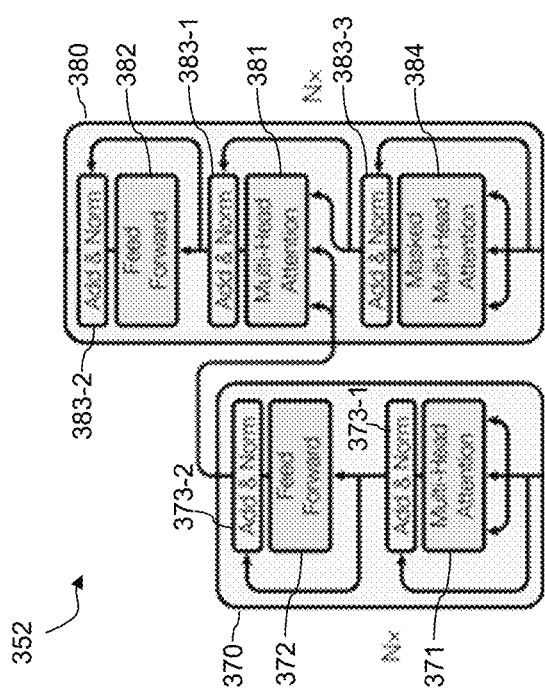
FIG. 3B depicts an architecture of a transformer in an illustrative embodiment.

The architecture of a transformer 352 in an illustrative embodiment is shown in FIG. 3B. Referring to FIG. 3B, the encoder 370 is composed of a stack of a N=6 identical layers. Each layer has two sub-layers. The first sub-layer includes a multi-head self-attention mechanism 371, and the second sub-layer includes a fully connected feed-forward network 372. A residual connection is employed around each of the two sub-layers, followed by layer normalization 373-1, 373-2. The output of each encoder sub-layer is LayerNorm(x+Sublayer(x)), where Sublayer(x) is the function implemented by the sub-layer. The decoder 380 is also composed of a stack of N=6 identical layers. Like each encoder layer, a layer of the decoder 380 includes two sub-layers including a multi-head self-attention mechanism 381, and a fully connected feed-forward network 382. Each layer of the decoder 380 further includes a third sub-layer comprising a masked multi-head self-attention mechanism 384. The third sub-layer performs multi-head attention over the output of the encoder stack. Similar to the encoder, residual connections around each of the sub-layers are employed, followed by layer normalization 383-1, 383-2 and 383-2. The masked multi-head self-attention mechanism 384 prevents positions from attending to subsequent positions. This masking, combined with the fact that output embeddings are offset by one position, ensures that predictions for position i can depend only on known outputs at positions less than i. See Ashish Vaswani et al., *Attention Is All You Need*, $31^{st}$ Conference on Neural Information Processing Systems (NIPS 2017) (ArXiv Paper No. 1706.03762), which is incorporated by reference herein.

Illustrative embodiments utilize a Key2Text (K2T) or an OpenAI™ GPT2 transformer pre-trained with large amounts (e.g., millions of instances) of textual corpus data using, for example, PyTorch® and/or Tensorflow® software. The textual corpus data used for pre-training comprises, for example, community data from sources such as, but not necessarily limited to, Wikipedia®, news sources, social media (e.g., Twitter®) feeds, etc. Considering this data will involve a massive amount of enterprise specific design document data (including specific lingo like APEX, LIGHTNING, MAESTRO, etc.), the transformer models are customized and re-trained with domain-specific data.

Illustrative embodiments utilize a Key2Text Python® package that leverages pre-trained K2T-base transformers to generate word combinations (e.g., sentences, phrases, etc.) from a set of input words. The package is built on top of a T5 transformer model and simplifies the APIs to use the model. FIG. 4 depicts example pseudocode 400 for leveraging Key2Text transformers to generate word combinations from a set of input words in an illustrative embodiment.

FIG. 5 depicts example pseudocode 500 for passing words for product attributes as a list of text to a model for sentence generation. In illustrative embodiments, a model is created from a pipeline. For example, a K2T-base that is based on a T5-base transformer and pre-trained with general purpose language data is indicated. Hyperparameters like the number of beams (e.g., the number of steps for each search path or probable words/text) and the no repeat n-gram size (e.g., the size of an n-gram that cannot occur more than once) are specified. As shown in FIG. 5, words for product attributes are passed as a list of text to the model for sentence generation.

Another approach in illustrative embodiments is to leverage an advanced OpenAI™ GPT2 transformer, which is trained using a massive amount of general-purpose text and capable of generating multiple word combinations from the same input words. A pre-trained GPT2 model is created from a transformer pipeline and the attribute values are passed in concatenated text to generate word combinations. FIG. 6 depicts example pseudocode 600 for generating a pre-trained GPT2 transformer model from a transformer pipeline and passing attribute values in concatenated text to generate word combinations.

In illustrative embodiments, a pre-trained transformer is augmented with training data from corpus data that includes enterprise specific domain data (e.g., historical data from program design data corpus 154). This can be achieved by loading and pre-processing (e.g., removing stop words, emojis, etc., perform stemming, lemmatization, etc.) custom training datasets to prepare for tokenization. Tokenizing converts words to numbers, which facilitates building of word vectors for NLP tasks. Tokenization can be done using a HuggingFace function "DistilBertTokenizerFast( )." Once the model is augmented with a domain specific corpus, generated code change descriptions will be highly accurate and standardized. These generated code change descriptions can be included in design documents, thus enabling automated synchronization of code to design documents, thereby providing capabilities not offered by conventional approaches.

In the routing and updating stage, output content (e.g., a generated code change description) from the description generation engine 150 is routed to a selected one of the document repositories 103 (e.g., Wiki, Jira, Confluence, etc.) via a corresponding repository interface 162 associated with the selected one of the document repositories 103. The repository interfaces 162 are configured to construct URLs using metadata received from the data formatting engine 140.

As noted previously, the metadata comprises, for example, identifying information of an application for which the code changes have been made (e.g., application name or other identifier), identifying information of the document repository (e.g., URIs, URLs, macros, annotations, etc.) including the design documentation corresponding to the code changes, and/or identifying information of one or more documents in the document repository corresponding to the code changes. Based at least in part on the metadata, the document repository selection layer 161 of the routing engine 160 identifies to which one of the document repositories 103 the generated code change description should be sent, and determines a location of the identified document repository 103. The location identification layer 163 determines a location of any documents in the identified document repository 103 corresponding to the code changes, and a location within a given document where to add the generated description. In some embodiments, the location identification layer 163 identifies a location to update within a document based on macros and annotation. The location identification layer 163 constructs a URL to be used in connection with the transmission of the natural language description to the document repository, wherein the URL corresponds to one or more of the location of the document repository, the location of the one or more documents and the location within the one or more documents. In a non-limiting example, metadata from the data formatting engine 140 may include the following:

Base URL: https://confluence.dell.com/display/EISB

APP Name: order-management

Based on this metadata, the location identification layer 163 may construct the following URL to be used in connection with the transmission of the natural language description to the Confluence document repository:

https://confluence.dell.com/display/EISB/order-management.

Referring to block 170 of FIG. 2, (create/update document 170), the code change description will be added to the Confluence document repository in an existing document or a new document can be created therein to add the update in accordance with the constructed URL. The location identification layer 163 is further configured to scan pages of a document repository 103 for updating. For example, referring back to the operational example of creating a rest service to provide order details for a given order number, the location identification layer 163 may scan a Confluence page to update a "/getOrders" API endpoint section based on the following annotation that may be present in code changes:

@*RequestMapping*(value = "/order/{*id*}/{*orderType*}/{region}", method = *RequestMethod.GET*).

Figure 9:
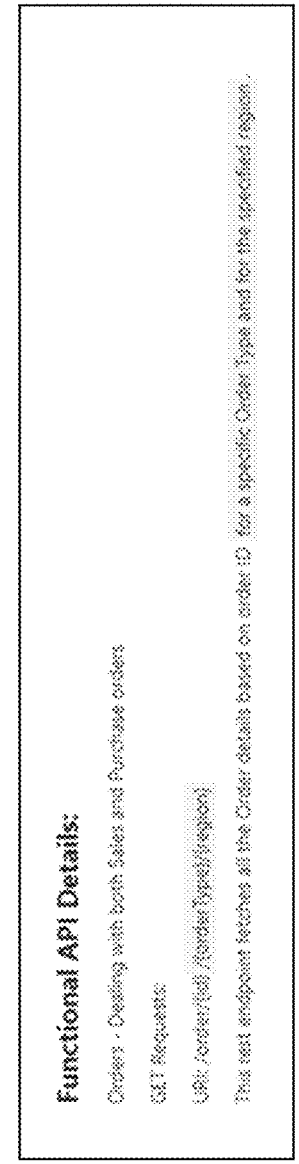
FIG. 9 depicts design documentation updated with a generated description of code changes in an illustrative embodiment.

The new functionality will be reflected in the appropriate technical document in a given repository by including the generated natural language description of the one or more code changes. For example, FIG. 9 depicts design documentation 900 updated with a generated description of code changes that states "This rest endpoint fetches all the order details based on order ID for a specific order type for the specified region."

Figure 10B:
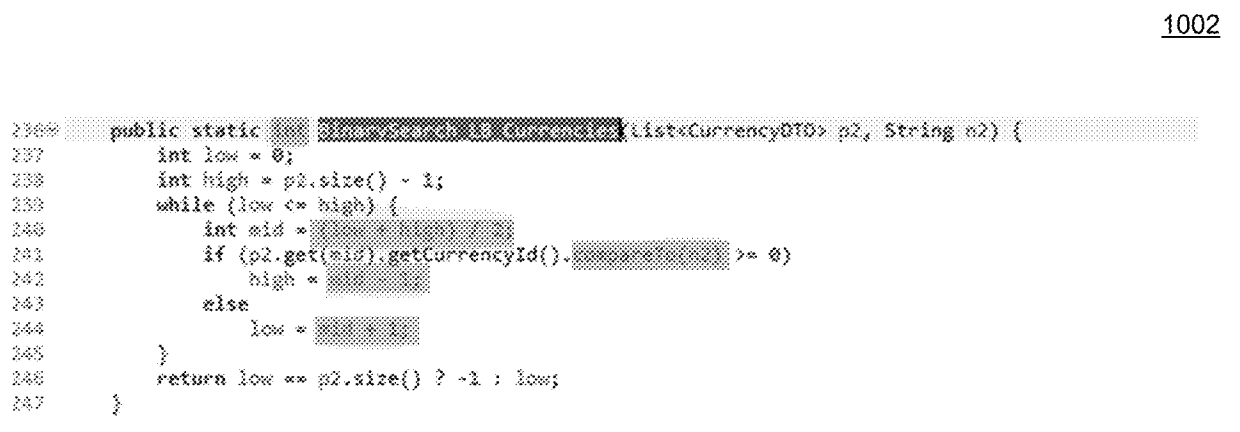

In an operational example, code changes may relate to software used in connection with requests for proposals and negotiation of costs for externally procured direct material components and sub-assembly parts from a first application into a second application. In connection with this operational example, FIGS. 10A and 10B depict collected data 1001 and 1002 corresponding to first code changes with highlighted key words, and FIG. 11 depicts collected data 1100 corresponding to second code changes with highlighted key words. In connection with FIGS. 10A and 10B, based at least in part on the highlighted key words, the natural language description of the functionality associated with the code change generated by the description generation engine 150 may state: "Finding the currency index for a given request using binary search techniques." In connection with FIG. 11, based at least in part on the highlighted key words, the natural language description of the functionality associated with the code change generated by the description generation engine 150 may state: "Extracting the requested unit ID and unit code details from the units list for all the parts requested."

For additional code changes (not shown), the natural language description of the functionality associated with the code changes generated by the description generation engine 150 may state: "Designwin sends negotiated costs for externally procured direct material components and sub-assembly parts. Extracts the requested unit ID and unit code details from the units list for all the parts requested. Then, extract the requested award price details from the award price list of polydyne for all the parts requested. Similarly extract manufacturers and suppliers list for the given request from polydyne. Then, consolidate and prepare XML payload and send to E2OPEN."

According to one or more embodiments, the document repositories 103, code repository 105, program design data corpus 154 and other data corpuses, repositories or databases referred to herein can be configured according to a relational database management system (RDBMS) (e.g., PostgreSQL). In some embodiments, the document repositories 103, code repository 105, program design data corpus 154 and other data corpuses, repositories or databases referred to herein are implemented using one or more storage systems or devices associated with the design documentation management platform 110. In some embodiments, one or more of the storage systems utilized to implement the document repositories 103, code repository 105, program design data corpus 154 and other data corpuses, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the design documentation management platform 110, the code development engine 120, content collection engine 130, data formatting engine 140, description generation engine 150 and/or routing engine 160 in other embodiments can be implemented at least in part externally to the design documentation management platform 110, for example, as stand-alone servers, sets of servers or other types of systems coupled to the network 104. For example, the code development engine 120, content collection engine 130, data formatting engine 140, description generation engine 150 and/or routing engine 160 may be provided as cloud services accessible by the design documentation management platform 110.

The code development engine 120, content collection engine 130, data formatting engine 140, description generation engine 150 and/or routing engine 160 in the FIG. 1 embodiment are each assumed to be implemented using at least one processing device. Each such processing device generally comprises at least one processor and an associated memory, and implements one or more functional modules for controlling certain features of the code development engine 120, content collection engine 130, data formatting engine 140, description generation engine 150 and/or routing engine 160.

At least portions of the design documentation management platform 110 and the elements thereof may be implemented at least in part in the form of software that is stored in memory and executed by a processor. The design documentation management platform 110 and the elements thereof comprise further hardware and software required for running the design documentation management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the code development engine 120, content collection engine 130, data formatting engine 140, description generation engine 150, routing engine 160 and other elements of the design documentation management platform 110 in the present embodiment are shown as part of the design documentation management platform 110, at least a portion of the code development engine 120, content collection engine 130, data formatting engine 140, description generation engine 150, routing engine 160 and other elements of the design documentation management platform 110 in other embodiments may be implemented on one or more other processing platforms that are accessible to the design documentation management platform 110 over one or more networks. Such elements can each be implemented at least in part within another system element or at least in part utilizing one or more stand-alone elements coupled to the network 104.

It is assumed that the design documentation management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the code development engine 120, content collection engine 130, data formatting engine 140, description generation engine 150, routing engine 160 and other elements of the design documentation management platform 110, and the elements thereof can each be implemented in the form of one or more LXCs running on one or more VMs. Other arrangements of one or more processing devices of a processing platform can be used to implement the code development engine 120, content collection engine 130, data formatting engine 140, description generation engine 150, routing engine 160, as well as other elements of the design documentation management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the design documentation management platform 110 to reside in different data centers. Numerous other distributed implementations of the design documentation management platform 110 are possible.

Accordingly, one or each of the code development engine 120, content collection engine 130, data formatting engine 140, description generation engine 150, routing engine 160 and other elements of the design documentation management platform 110 can each be implemented in a distributed manner so as to comprise a plurality of distributed elements implemented on respective ones of a plurality of compute nodes of the design documentation management platform 110.

It is to be appreciated that these and other features of illustrative embodiments are presented by way of example only, and should not be construed as limiting in any way. Accordingly, different numbers, types and arrangements of system elements such as the code development engine 120, content collection engine 130, data formatting engine 140, description generation engine 150, routing engine 160 and other elements of the design documentation management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the design documentation management platform can be offered to cloud infrastructure customers or other users as part of FaaS, CaaS and/or PaaS offerings.

Figure 12:
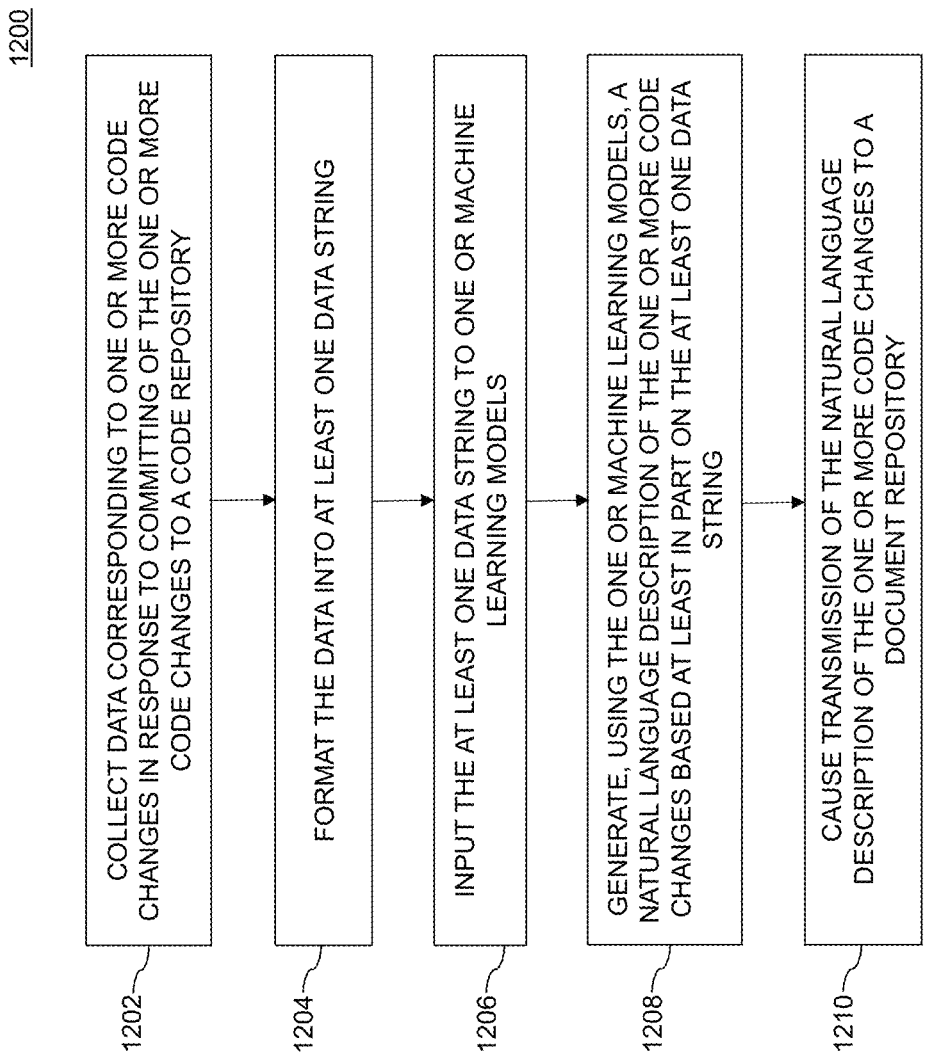
FIG. 12 depicts a process for design documentation management according to an illustrative embodiment.

The operation of the information processing system 100 will now be described in further detail with reference to the flow diagram of FIG. 12. With reference to FIG. 12, a process 1200 for design documentation management as shown includes steps 1202 through 1210, and is suitable for use in the system 100 but is more generally applicable to other types of information processing systems comprising a design documentation management platform configured for updating design documentation in response to committed code changes.

In step 1202, data corresponding to one or more code changes is collected in response to committing of the one or more code changes to a code repository. Collecting of the data corresponding to the one or more code changes may be performed through an API of a software development platform (e.g., Gitlab). In step 1204, the data is formatted into at least one data string. The formatting comprises removing redundancies from the data and determining and maintaining portions of the data specifying the one or more code changes.

In step 1206, the at least one data string is inputted to one or machine learning models. In step 1208, using the one or machine learning models, a natural language description of the one or more code changes is generated based at least in part on the at least one data string. The generating comprises using at least one natural language generation algorithm which utilizes one or more transformers to generate one or more word combinations in the natural language description. The at least one natural language generation algorithm utilizes one or more neural networks in combination with the one or more transformers to generate the one or more word combinations. The at least one natural language generation algorithm is trained with historical program design data. Step 1210 includes causing transmission of the natural language description of the one or more code changes to a document repository.

In illustrative embodiments, the data comprises the one or more code changes and metadata associated with the one or more code changes. The metadata comprises at least one of identifying information of an application for which the one or code changes have been made, identifying information of the document repository and identifying information of one or more documents in the document repository corresponding to the one or more code changes. Based at least in part on the metadata, at least one of the following is determined: (i) a location of the document repository, (ii) a location of the one or more documents in the document repository corresponding to the one or more code changes, and (iii) a location within the one or more documents where to include the natural language description of the one or more code changes.

A URL to be used in connection with the transmission of the natural language description to the document repository is constructed, wherein the URL corresponds to one or more of the location of the document repository, the location of the one or more documents and the location within the one or more documents. The process may further include causing the one or more documents in the document repository to be updated to include the natural language description of the one or more code changes.

It is to be appreciated that the FIG. 12 process and other features and functionality described above can be adapted for use with other types of information systems configured to execute design documentation management services in a design documentation management platform or other type of platform.

The particular processing operations and other system functionality described in conjunction with the flow diagram of FIG. 12 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 12 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a design documentation management platform as disclosed herein can provide a number of significant advantages relative to conventional arrangements. For example, the design documentation management platform advantageously updates design documents in response to new changes or enhancements. In more detail, a framework retrieves the latest commit details in real time along with corresponding metadata, and a machine learning model generates a description of the code changes in the commit details. As an additional advantage, the framework updates the correct document in the right location as a real time response to committing the code change. The location where the document is updated is added as part of metadata in the codebase.

The embodiments provide a technical solution that automatically transforms code changes in a repository to descriptive text in the design document. The code changes are received through APIs and formatted into data strings that can be input to a machine learning model for generation of descriptions of the functionality of the code changes. The machine learning model leverages advanced NLP, NLU, NLG and neural network techniques and trains a transformer using a domain specific design document corpus to generate natural language descriptions of code changes. Using macros and annotations for automatic updates to the documents, the framework intelligently identifies locations in the design documents where to incorporate the updates.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the design documentation management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a design documentation management platform in illustrative embodiments. These and other cloud-based systems in illustrative embodiments can include object stores.

Illustrative embodiments of processing platforms will now be described in greater detail with reference to FIGS. 13 and 14. Although described in the context of system 100, these platforms may also be used to implement at least portions of other information processing systems in other embodiments.

Figure 13:
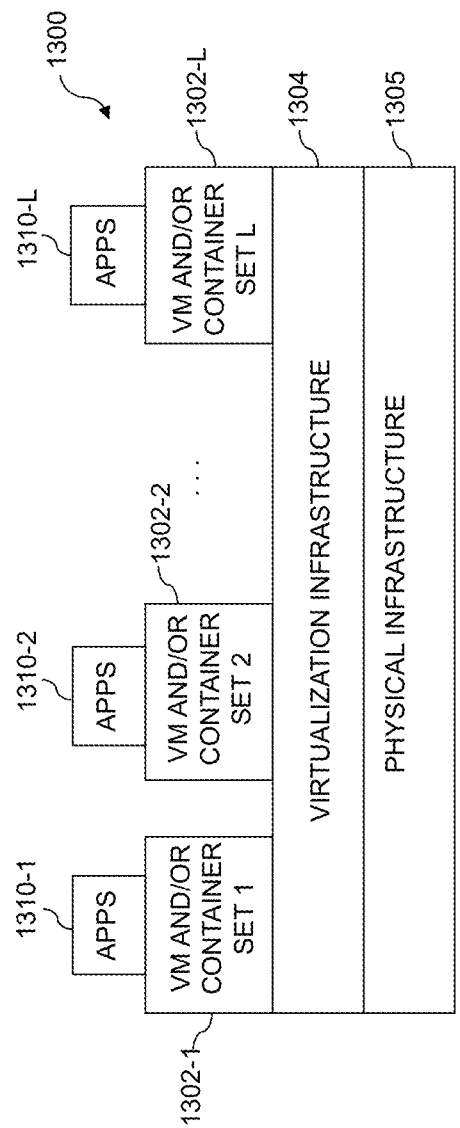
FIGS. 13 and 14 show examples of processing platforms that may be utilized to implement at least a portion of an information processing system according to illustrative embodiments.
Figure 14:
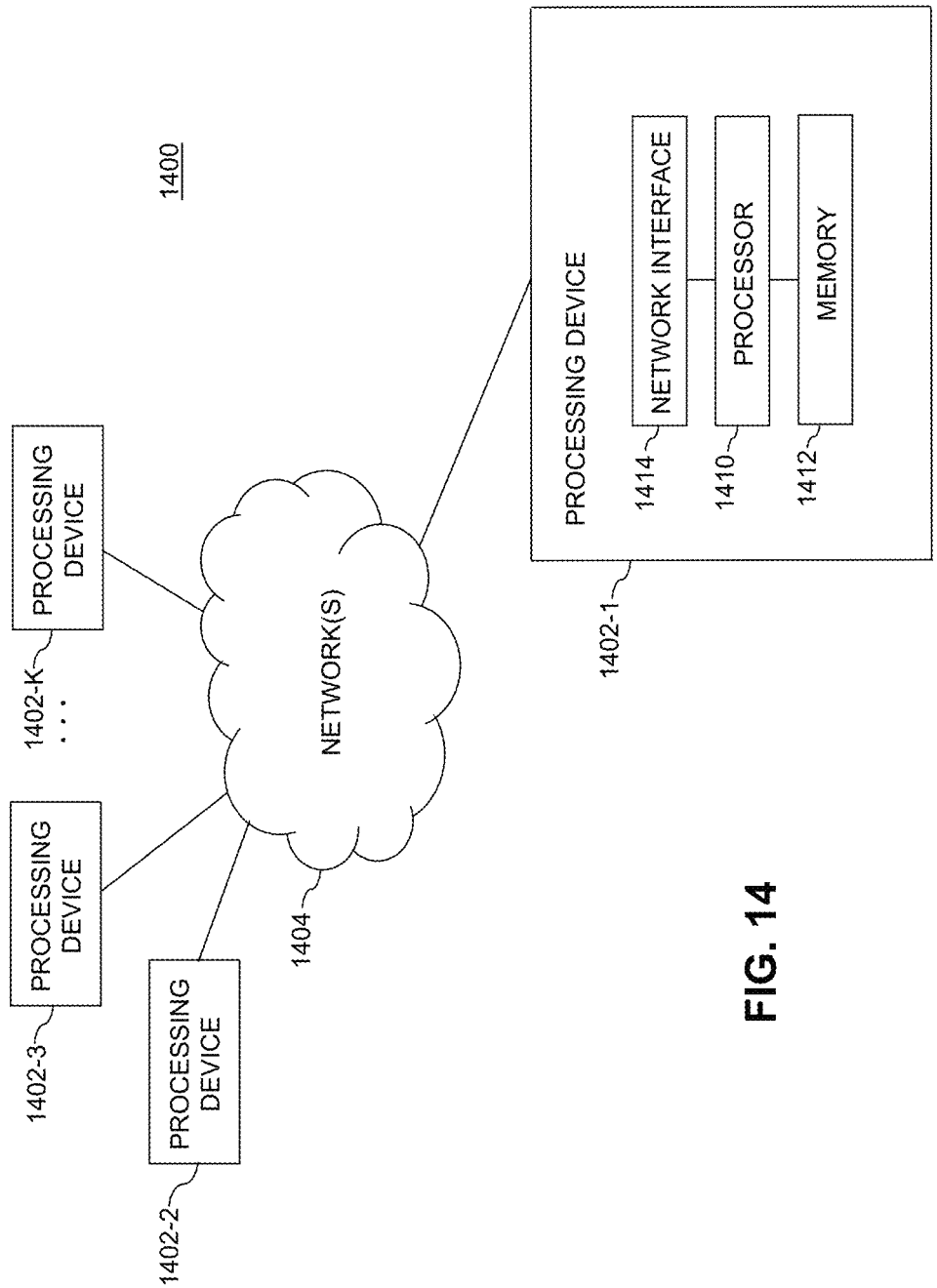

FIG. 13 shows an example processing platform comprising cloud infrastructure 1300. The cloud infrastructure 1300 comprises a combination of physical and virtual processing resources that may be utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412. The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the design documentation management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and design documentation management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    re-training one or more pre-trained machine learning models with enterprise-specific historical program design data to generate one or more augmented machine learning models;
    collecting data corresponding to one or more code changes in response to committing of the one or more code changes to a code repository, wherein the data comprises the one or more code changes and metadata associated with the one or more code changes;
    formatting the data into at least one data string;
    inputting the at least one data string to the one or more augmented machine learning models;
    generating, using the one or more augmented machine learning models, a natural language description of the one or more code changes based at least in part on the at least one data string;
    determining, based on the metadata, a location of a document repository, a location of one or more documents in the document repository corresponding to the one or more code changes, and a location within the one or more documents where to include the natural language description of the one or more code changes; and
    automatically causing transmission of the natural language description of the one or more code changes to the location within the one or more documents of the document repository;
    wherein the steps of the method are executed by a processing device operatively coupled to a memory.

2. The method of claim 1 wherein the metadata comprises at least one of identifying information of an application for which the one or code changes have been made, identifying information of the document repository and identifying information of one or more documents in the document repository corresponding to the one or more code changes.

3. The method of claim 1 further comprising constructing a uniform resource locator to be used in connection with the transmission of the natural language description to the document repository, wherein the uniform resource locator corresponds to one or more of the location of the document repository, the location of the one or more documents and the location within the one or more documents.

4. The method of claim 1 further comprising causing the one or more documents in the document repository to be updated to include the natural language description of the one or more code changes.

5. The method of claim 1 wherein the generating comprises using at least one natural language generation algorithm which utilizes one or more transformers to generate one or more word combinations in the natural language description.

6. The method of claim 5 wherein the at least one natural language generation algorithm utilizes one or more neural networks in combination with the one or more transformers to generate the one or more word combinations.

7. The method of claim 1 wherein the collecting of the data corresponding to the one or more code changes is performed through an application programming interface of a software development platform.

8. The method of claim 1 wherein the formatting comprises removing redundancies from the data and determining and maintaining portions of the data specifying the one or more code changes.

9. An apparatus comprising at least one processing platform, the processing platform comprising at least one processor coupled to at least one memory, the at least one processing platform, when executing program code, is configured:
    to re-train one or more pre-trained machine learning models with enterprise-specific historical program design data to generate one or more augmented machine learning models;
    to collect data corresponding to one or more code changes in response to committing of the one or more code changes to a code repository, wherein the data comprises the one or more code changes and metadata associated with the one or more code changes;
    to format the data into at least one data string;
    to input the at least one data string to the one or more augmented machine learning models;
    to generate, using the one or more augmented machine learning models, a natural language description of the one or more code changes based at least in part on the at least one data string;
    to determine, based on the metadata, a location of a document repository, a location of one or more documents in the document repository corresponding to the one or more code changes, and a location within the one or more documents where to include the natural language description of the one or more code changes; and to automatically cause transmission of the natural language description of the one or more code changes to the location within the one or more documents of the document repository.

10. The apparatus of claim 9 wherein the metadata comprises at least one of identifying information of an application for which the one or code changes have been made, identifying information of the document repository and identifying information of one or more documents in the document repository corresponding to the one or more code changes.

11. The apparatus of claim 9 wherein the at least one processing platform, when executing program code, is further configured to construct a uniform resource locator to be used in connection with the transmission of the natural language description to the document repository, wherein the uniform resource locator corresponds to one or more of the location of the document repository, the location of the one or more documents and the location within the one or more documents.

12. The apparatus of claim 9, wherein the at least one processing platform, when executing program code, is further configured to cause the one or more documents in the document repository to be updated to include the natural language description of the one or more code changes.

13. The apparatus of claim 9, wherein the generating comprises using at least one natural language generation algorithm which utilizes one or more transformers to generate one or more word combinations in the natural language description.

14. The apparatus of claim 13, wherein the at least one natural language generation algorithm utilizes one or more neural networks in combination with the one or more transformers to generate the one or more word combinations.

15. An article of manufacture comprising a non-transitory processor-readable storage medium having stored therein program code of one or more software programs, wherein the program code when executed by at least one processing device causes the at least one processing device to perform the steps of:

re-training one or more pre-trained machine learning models with enterprise-specific historical program design data to generate one or more augmented machine learning models;

collecting data corresponding to one or more code changes in response to committing of the one or more code changes to a code repository, wherein the data comprises the one or more code changes and metadata associated with the one or more code changes;

formatting the data into at least one data string;

inputting the at least one data string to the one or more augmented machine learning models;

generating, using the one or more augmented machine learning models, a natural language description of the one or more code changes based at least in part on the at least one data string;

determining, based on the metadata, a location of a document repository, a location of one or more documents in the document repository corresponding to the one or more code changes, and a location within the one or more documents where to include the natural language description of the one or more code changes; and automatically causing transmission of the natural language description of the one or more code changes to the location within the one or more documents of the document repository.

16. The article of manufacture of claim 15 wherein the metadata comprises at least one of identifying information of an application for which the one or code changes have been made, identifying information of the document repository and identifying information of one or more documents in the document repository corresponding to the one or more code changes.

17. The article of manufacture of claim 15, wherein the program code when executed by at least one processing device further causes the at least one processing device to cause the one or more documents in the document repository to be updated to include the natural language description of the one or more code changes.

18. The article of manufacture of claim 15, wherein the generating comprises using at least one natural language generation algorithm which utilizes one or more transformers to generate one or more word combinations in the natural language description.

19. The article of manufacture of claim 18, wherein the at least one natural language generation algorithm utilizes one or more neural networks in combination with the one or more transformers to generate the one or more word combinations.

20. The article of manufacture of claim 15, wherein the collecting of the data corresponding to the one or more code changes is performed through an application programming interface of a software development platform.

\* \* \* \* \*